US009111015B1

(12) United States Patent
Ranade et al.

(10) Patent No.: US 9,111,015 B1
(45) Date of Patent: Aug. 18, 2015

(54) SYSTEM AND METHOD FOR GENERATING A POINT-IN-TIME COPY OF A SUBSET OF A COLLECTIVELY-MANAGED SET OF DATA ITEMS

(75) Inventors: Dilip Madhusudan Ranade, Maharashtra (IN); Kedar Shrikrishna Patwardhan, Maharashtra (IN); Maneesh Pusalkar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 795 days.

(21) Appl. No.: 12/893,108

(22) Filed: Sep. 29, 2010

(51) Int. Cl.
*G06F 7/00* (2006.01)
*G06F 17/00* (2006.01)
*G06F 17/30* (2006.01)

(52) U.S. Cl.
CPC .................. *G06F 17/30997* (2013.01)

(58) Field of Classification Search
CPC .................................................. G06F 17/30997
USPC ........................................................ 707/649
See application file for complete search history.

(56) References Cited

U.S. PATENT DOCUMENTS

| 8,250,033 | B1* | 8/2012 | De Souter et al. | 707/637 |
| 8,396,838 | B2* | 3/2013 | Brockway et al. | 707/662 |
| 2006/0206536 | A1* | 9/2006 | Sawdon et al. | 707/200 |
| 2007/0006018 | A1* | 1/2007 | Thompson et al. | 714/6 |
| 2009/0254585 | A1* | 10/2009 | Akers et al. | 707/103 R |
| 2011/0093471 | A1* | 4/2011 | Brockway et al. | 707/747 |

OTHER PUBLICATIONS

Cornell, Brian, "Wayback, User-Level Versioning File System for Linux," 2004, 2 pages.
Muniswamy-Reddy, Kiran-Kumar, et al., "A Versatile and User-Oriented Versioning File System," Stony Brook University, Appears in the proceedings of the Third USENIX Conference on File and Storage Technologies (FAST 2004); pp. 1-14.
Peterson, Zachary, et al., "Ext3cow: The Design, Implementation, and Analysis of Metadata for a Time-Shifting File System," Technical Report HSSL-2003-03; Hopkins Storage Systems Lab, Department of Computer Science, The John Hopkins University, pp. 1-14, 2003.
Phillips, Daniel, "Tux3 Report: Now in Kernel and the Fun Begins," 2008, http://lwn.net/Articles/308652; 3 pages.

* cited by examiner

*Primary Examiner* — Mahesh Dwivedi
*Assistant Examiner* — Kris Mackes
(74) *Attorney, Agent, or Firm* — Campbell Stephenson LLP (57) ABSTRACT

Various systems and methods selectively generate a point-in-time copy of less than all of the data items within a collectively-managed set of data items. One method involves detecting a modification to a first unit of data within a collectively managed set, subsequent to generation of a selective snapshot of the collectively managed set, and then accesses a first tag associated with the first unit of data. Based on a value of the first tag, the method determines whether the first unit of data is included in a subset of the collectively managed set. The subset includes at least two of the units of data and fewer than all of the units of data in the collectively managed set. Based upon whether the unit of data is included in the subset, the method selects whether to preserve an original value of the first unit of data.

17 Claims, 5 Drawing Sheets

SYSTEM AND METHOD FOR GENERATING A POINT-IN-TIME COPY OF A SUBSET OF A COLLECTIVELY-MANAGED SET OF DATA ITEMS

FIELD OF THE INVENTION

This invention relates to the creation of point-in-time copies of data and, more particularly, to creating point-in-time copies of less than all of the available data within a collectively-managed set of data.

DESCRIPTION OF THE RELATED ART

A point-in-time copy of data, which can also be referred to as a snapshot, is a copy of a particular set of data, as that set of data existed at a discrete point in time. A point-in-time copy can be created in a manner that requires reduced downtime of the data being copied. For example, a point-in-time copy can initially just refer (e.g., using logical structures such as pointers, bitmaps, and the like) to the set of data being copied. As that set of data is subsequently modified, the pre-modification values can be copied to the point-in-time copy prior to being overwritten. Since such point-in-time copies can be created relatively quickly, point-in-time copies can be used as the source of operations such as backups, indexing, and virus scanning in order to reduce the amount of time to which access to the original set of data needs to be restricted.

Most techniques for generating point-in-time copies operate on an entire logical data set, such as a volume or file system. Accordingly, these techniques do not allow point-in-time copies to be made of less than the entire data set.

SUMMARY OF THE INVENTION

Various systems and methods for selectively generating a point-in-time copy of less than all of the data items within a collectively-managed set of data items are disclosed. One such method involves detecting a modification to a first unit of data within a collectively managed set of data, subsequent to generation of a selective snapshot of the collectively managed set of data. The method then accesses a first tag associated with the first unit of data. The first tag identifies one or more of several subsets of the collectively managed set of data. Based on a value of the first tag, the method determines whether the first unit of data is included in a subset of the collectively managed set of data. The subset includes at least two of the units of data and fewer than all of the units of data in the collectively managed set of data. Based upon whether the unit of data is included in the subset, the method selects whether to preserve an original value of the first unit of data. The original value is a value of the first unit of data at a point in time at which the selective snapshot was generated. The act of selecting is performed by a computing device implementing a selective snapshot module.

In some embodiments, the collectively managed set of data is an object storage device, and the first unit of data is an object. In other embodiments, the collectively managed set of data is a file system, and the first unit of data is a file.

In one embodiment, the method also detects that a new file is being added to a directory within the file system and associates the new file with a tag. The directory is associated with the tag prior to detection that the new file is being added.

If it is determined that the first unit of data is not included in the subset, the act of selecting can involve selecting to not preserve the original value of the first unit of data. If it is determined that the first unit of data is included in the subset, the act of selecting can involve selecting to preserve the original value of the first unit of data.

In some embodiments, the act of determining can involve comparing a value of the first tag to a value of a second tag. The second tag is associated with the selective snapshot.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
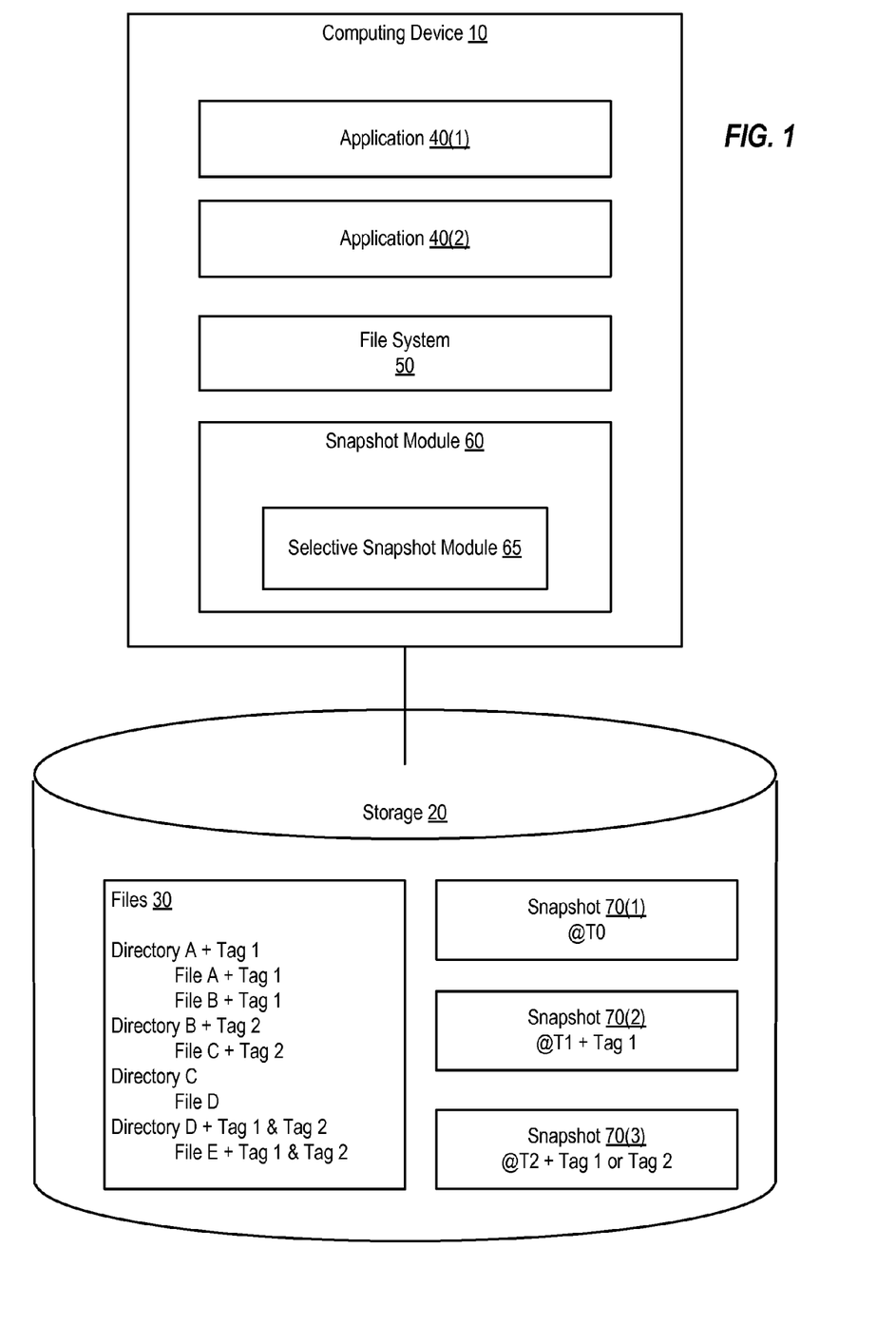
FIG. 1 is a block diagram of a system that generates a point-in-time copy of a subset of a collectively-managed set of data, according to one embodiment of the present invention.

FIG. 1 is a block diagram of a computing system. As shown, computing device 10 is coupled to storage device 20. Computing device 10 can be any of a variety of different types of computing devices, including a server, personal computing device, laptop computer, net book, personal digital assistant, cellular phone, or the like. Storage device 20 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Computing device 10 and storage device 20 can be integrated or separate. If separate, computing device 10 and storage device 20 can be coupled by a network such as the Internet or a storage area network.

In this example, computing device implements several applications 40(1) and 40(2). Each application can be any of a variety of different types of software programs, including programs that act as servers (e.g., database management systems, file servers, email servers, and the like) and programs that act as clients (e.g., email clients, web browsers, backup clients, and the like). Application 40 can alternatively be a stand-alone user-level program (e.g., a document processing application, a graphics editing program, a media player, or the like). Applications 40(1) and 49(2) can access files 30 in order to display, edit, execute, or otherwise process those files.

Computing device 10 also implements a file system 50. File system 50 is a software program that organizes and controls access to files 30, which are stored on a block device (e.g., a volume) such as storage device 20. File system 50 can maintain metadata that identifies each file (including directories, which are special files that can act as containers for one or more other files), as well as each file's location on a storage device, each file's size, and other information such as the file's creation time, most recent access time, and the like. Such information is maintained in an inode structure for certain types of files systems.

The term "file system" can refer to both the application (which itself can be part of an operating system) that organizes the files and the collection of files that are organized by that application. Files can be organized hierarchically, with directories collecting groups of files and/or other directories.

In this example, files 30 include several files, which are organized into four directories, Directory A, Directory B, Directory C, and Directory D. Directory A includes two files, File A and File B. Directory B includes one file, File C. Directory C includes one file, File D. Directory D includes one file, File E. It is noted that this is a simplified example, and that other embodiments can include far more complex organizational schemes with a greater number of files and/or directories than are shown here.

Computing device 10 implements a snapshot module 60. Snapshot module 60 is configured to generate snapshots of data stored on storage device 20. Each snapshot is generated using a space efficient technique such as copy on write (COW) or redirect (or divert) on write (ROW). Such techniques allow snapshots to be generated quickly, without needing to initially make copies of all of the data represented in the snapshot, as described in more detail below.

To generate a snapshot, snapshot module 60 initially "freezes" access to files 30 organized by file system 50 by locking access to the files 30. Once all of the outstanding accesses to the files have completed and new access is blocked, the file system is said to be frozen. At this point in time, snapshot module 60 generates a space efficient snapshot. Initially, at the time of creation, this snapshot only stores metadata that maps the data in the snapshot to the original data stored on storage device 30. Such a snapshot is space efficient in that less space is required to store the snapshot than is required to store the data represented by the snapshot.

Once the snapshot has been generated, snapshot module 60 unfreezes access to the file system. To maintain the snapshot as a point in time copy of files 30 at the time that the snapshot was generated, snapshot module 60 detects all subsequent requests to modify files 30 (e.g., as generated by applications 40(1) and/or 40(2)) and, before those modifications are applied to files 30, preserves the original value being modified in the snapshot. For example, snapshot module 60 can detect a request to write to a portion of one of files 30. Prior to allowing the write to be performed, snapshot module 60 can perform a copy on write action to copy the original value of the portion of the file being modified to the snapshot, thus preserving the original value in the snapshot. Alternatively, snapshot module 60 can perform a redirect write action to redirect the write to another location, such that the original value is preserved in its original location.

In some embodiments, whenever a snapshot is created, the snapshot includes a snapshot inode for each file included in the snapshot. Initially, these snapshot inodes simply refer to the corresponding inode for the appropriate file. If a file is subsequently modified and COW techniques are used to generate the snapshot, the original value of the file can be moved to the snapshot inode for that file. When a user reads from a snapshot, the read will either be redirected to files 30 (e.g., if the snapshot inode still simply refers to the corresponding inode, indicating that the file has not been modified since the snapshot was generated) or will retrieve the value stored in the snapshot inode (e.g., if the file has been modified since the file was generated).

Snapshot module 60 includes a selective snapshot module 65, which is configured to generate a snapshot of less than all of the units of data (e.g., files) in a collectively-managed set of data such as the file system that includes files 30. To do this, selective snapshot module 65 uses tags associated with each file, as well as one or more tags associated with a request to generate a snapshot. By comparing these two sets of tags (the tag(s) in the request and the tag(s) associated with the files), selective snapshot module 65 determines whether, upon being modified subsequent to generation of the requested snapshot, the original value of a portion of a value will be preserved or not. Accordingly, selective snapshot module 65 can include some, but not all, of the files within the snapshot by selecting which files are preserved in the snapshot. In general, a selective snapshot preserves more than file but fewer than all files within a file system.

In the example of FIG. 1, certain files are associated with certain tags. Directory A, File 1, File 2, Directory D, and File E are associated with Tag 1. Directory B, File C, Directory D, and File E are associated with Tag 2. Some files, like Directory C and File D, are not associated with any tags. Other files, like Directory D and File E, are associated with multiple tags. Each tag can be a set of one or more bits or a more complex data structure, such as a text string or set of alphanumeric characters. Each tag identifies one or more subsets of data.

The tags can be generated by a user, including a human user such as an administrator or an application. These tags can be specified by interacting with an interface (e.g., a command line interface, application programming interface, graphical user interface, or the like) provided by file system 50 or selective snapshot module 65. The tags can be stored by file system 50 as part of the metadata associated with files 30. For example, the tag(s) assigned to a particular file can be stored as part of the inode corresponding to that file.

The tags can be assigned using a variety of different criteria. For example, in some embodiments, tags can be assigned to differentiate among files processed by different applications. Thus, all of the files processed by application 40(1) could be assigned Tag 1, and all of the files processed by application 40(2) could be assigned Tag 2. In some embodiments, tags are assigned to identify files that are used by different users or groups of users. For example, within a corporation, Tag 1 could identify a sales group, while Tag 2 identifies a finance group. A variety of different criteria (e.g., relating to permissions or ownership, creation time, application, users, and the like) can even be used within the same embodiment. In some embodiments, once a user has assigned a tag to one file, related files (e.g., files within the same directory as the tagged file, the directory including the tagged file, and so on) can also be assigned the same tag automatically by file system 50 and/or selective snapshot module 65.

In some embodiments, once an initial set of tag assignments has been made, selective snapshot module 65 can maintain the tags as new files are added to the file system. Thus, if a new file is added to a directory, selective snapshot module 65 can automatically assign the tag(s) associated with the directory to the new file.

Whenever a request for a snapshot is received, selective snapshot module 65 can parse the request to see if any tags are associated with the request. The inclusion of a tag with the request indicates that a selective snapshot (as opposed to a conventional full snapshot) is being requested. The tag(s) associated with the request can indicate which files must be included within the selective snapshot and/or which files must be excluded from the selective snapshot.

By only preserving certain files, selective snapshot module 65 preserves only those files that a user desires to include in the snapshot and does not waste storage space or processing cycles preserving unwanted values. In at least some embodiments that use inodes, the selective snapshot can include snapshot inodes for only those files being preserved in the selective snapshot.

For example, the request can indicate that all files associated with Tag 1 and no Files associated with Tag 2 should be included in the selective snapshot. In that situation, selective snapshot module 65 would preserve the original values (at the time that the snapshot is generated) of Directory A and Files A and B within the snapshot (e.g., using COW or ROW techniques) but would not preserve any other values.

As another example, the request could specify that all files not associated with Tag 2 should be included in the selective snapshot. In this situation, selective snapshot module 65 would preserve the original values (at the time that the snapshot is generated) of Directories A and C and Files A, B, and D but would not preserve any other values.

As shown in FIG. 1, a set of three snapshots 70(1), 70(2), and 70(3) have been generated of files 30 and stored on storage device 20. The first snapshot 70(1) was generated at time T0 and was not a selective snapshot. Accordingly, snapshot 70(1) will preserve the original values (at T0) of all of files 30.

The second snapshot 70(2) was generated at time T1 and includes all files associated with Tag 1. Accordingly, files that are not associated with Tag 1 will not be preserved in this snapshot.

The third snapshot 70(3) was generated at time T2 and includes all files associated with Tag 1 or Tag 2. This snapshot will preserve the original values (at T2) of all files other than Directory C and File D, since all of the other files are associated with at least one of Tag 1 or Tag 2.

In alternative embodiments, instead of having various different values of the tags, the tags can be implemented as simple flags. One value of the flag indicates that the associated file should be preserved in selective snapshots, while the other value of the flag indicates that the associated file should not be preserved in selective snapshots. The request to generate a snapshot can similarly include a simple flag indicating whether the snapshot being requested is a selective snapshot.

A user (e.g., such a backup application) can access a snapshot by mounting that snapshot and then reading and writing to that snapshot. In the case of a selective snapshot, not all files are preserved within the snapshot. If a user attempts to read a file that was not preserved from the selective snapshot, selective snapshot module 65 can return an error message and/or the current (non-snapshot) value of that file.

In general, a selective snapshot module such as that shown in FIG. 1 can be used to generate selective snapshots of some but not all of the units of data (e.g., files, logical objects, and the like) in a collectively managed set of data such as a file system. For example, such a selective snapshot module can be used to generate selective snapshots of some but not all of the files in a file system, as illustrated in FIG. 1. As another example, a selective snapshot module can be used to generate selective snapshots of some but not all of the objects (as identified by object identifiers, or OIDs) in an object storage device. When used with object storage devices, the tag(s) assigned to a given object can be linked to that object's OID.

Figure 2:
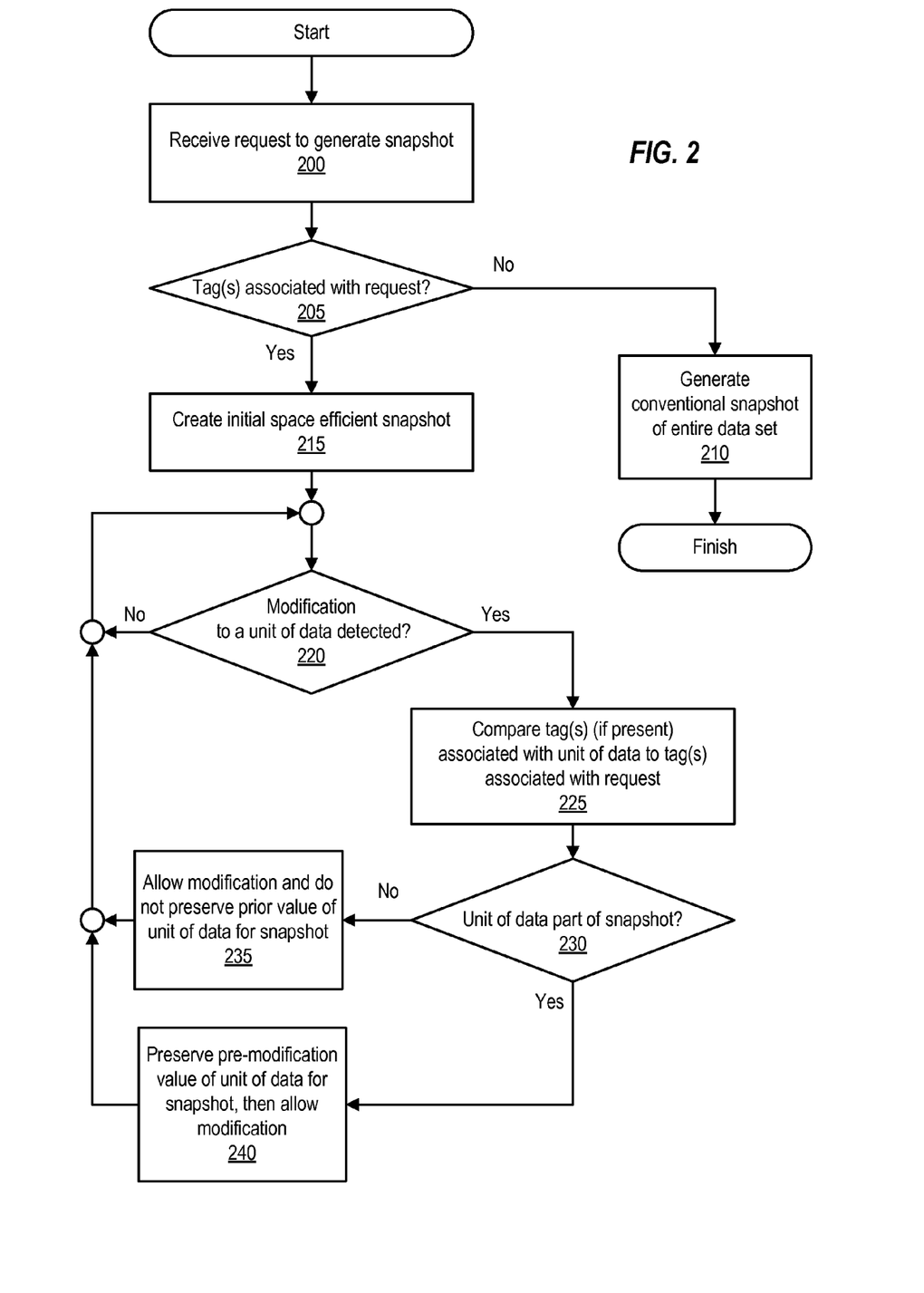
FIG. 2 is a flowchart of a method of generating a point-in-time copy of a subset of a collectively-managed set of data, according to embodiments of the present invention.

FIG. 2 is a flowchart of a method of generating a point-in-time copy of a subset of a collectively-managed set of data. This method can be performed by a snapshot module that includes a selective snapshot module, like selective snapshot module 65 of FIG. 1.

The method begins at 200, when a request to generate a snapshot of a collectively-managed set of units of data, such as a file system or object storage device, is received. This request can be received from another application (e.g., a backup application) and/or from an administrator. If the request is a request for a selective snapshot, the request will include one or more tags, as detected at 205.

If the request does not include any tags and thus simply requests a conventional snapshot of all of the units of data in the collectively-managed set of data, the snapshot module will generate a conventional snapshot, as shown at 210. This snapshot will preserve the values of all of the units of data at the time that the snapshot was generated.

If the request does include one or more tags, and thus requests a selective snapshot, the snapshot module will create a space efficient snapshot of at least the units of data indicated as being desired in the request, as shown at 215. The desired units of data can be identified based upon the tag(s) associated with the request, the tag(s) associated with the units of data, and, in some embodiments, based upon how the request is specified. For example, the request can specify a rule such as "preserve all files with Tag X," or "preserve all files with Tag X but not Tag Y," or "preserve all files except those with Tag Y." Alternatively, a rule (e.g., must preserve or must not preserve) can be predefined for all requests, and the request can simply specify the tag(s) to input to that rule.

After the snapshot is generated at 215, the snapshot module will selectively preserve only the values of those units of data indicated as being desired in the request. Thus, when a modification to a unit of data within the collectively-managed set of data is detected, the snapshot module will determine, based upon the tag(s) associated with the request and the tag(s) (if any) associated with the unit of data being modified, whether to preserve the pre-modification value of that unit of data in the selective snapshot.

Thus, at 220, the snapshot module detects a modification to a unit of data. The snapshot module then compares the tag(s), if any, associated with that unit of data to the tag(s) included in the request. Based upon the rule being used and the outcome of the comparison, the snapshot module determines whether that unit of data is being preserved in the selective snapshot or not, as indicated at 225. If the unit of data is being preserved, the snapshot module will preserve the pre-modification value of that unit of data (i.e., the value of that unit of data at the time that the snapshot was generated) before allowing the modification to be performed, as indicated at 240. Otherwise, the snapshot module will simply allow the modification to be performed and will not preserve the original value of that unit of data, as indicated at 235. Operations 220, 225, 230, and/or 235 can be repeated until the selective snapshot is deleted.

Figure 3:
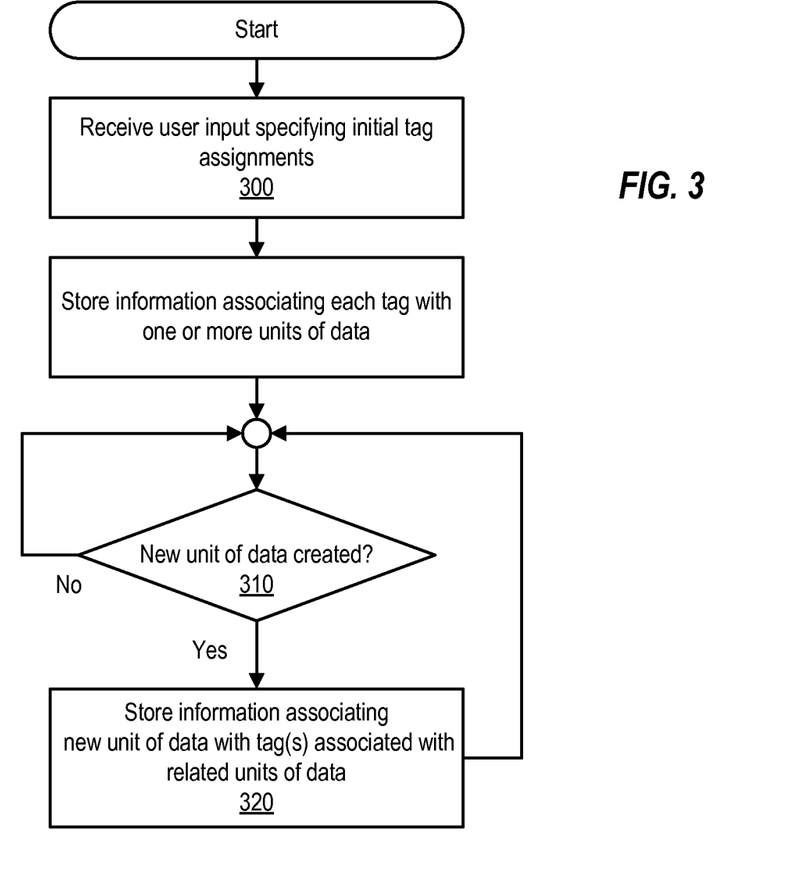
FIG. 3 is a flowchart of a method of managing tags associated with a subset of a collectively-managed set of data, according to one embodiment of the present invention.

FIG. 3 is a flowchart of a method of managing tags associated with a subset of a collectively-managed set of data. Like the method of FIG. 2, this method can be performed by a snapshot module that includes a selective snapshot module, like selective snapshot module 65 of FIG. 1.

The method begins at 300, when user input (e.g., from an administrator and/or application) is received. The user input specifies the initial tag assignments for one or more units of data within the collectively-managed set of data. These assignments indicate the tag(s) (if any) to be assigned to each unit of data.

Information associating each tag with one or more units of data to which that tag has been assigned is then stored. For example, each tag assigned to a particular file can be stored in that file's inode. Alternatively, each tag assigned to a logical object can be linked to that logical object's OID.

After the initial assignments have been made, new units of data may be added to the collectively-managed set of data, as detected at 310. In response to detecting that a new unit of data has been created, the tag(s) (if any) associated with one or more related units of data can be automatically assigned to the new unit of data, as indicated at 320. For example, if a new file is created in a directory in a file system, that new file can be assigned the same tags that are assigned to the directory that contains the file. Likewise, a new file can be assigned the same tags as other files within the same directory. A new unit of data can also be assigned a tag automatically based upon which application and/or user created the unit of data.

Figure 4:
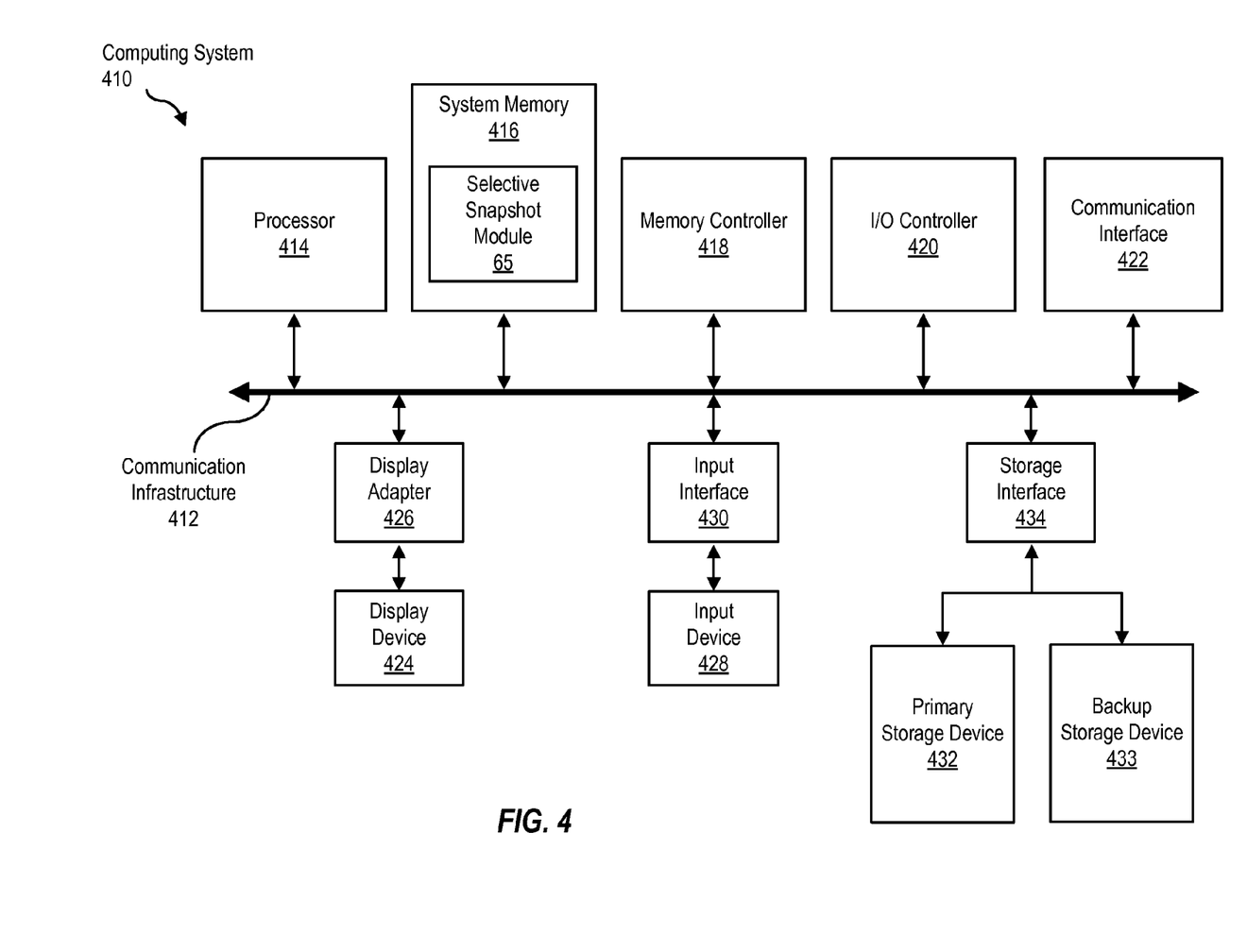
FIG. 4 is a block diagram of a computing device, illustrating how a selective snapshot module can both be implemented in software, according to one embodiment of the present invention.

FIG. 4 is a block diagram of a computing system 410 capable of implementing a selective snapshot module as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements a selective snapshot module 80, computing system 410 becomes a special purpose computing device that is configured to generate snapshots that contain only a non-empty subset (e.g., two or more but fewer than all of the units of data contained in a collectively managed set of data) of a collectively-managed set of data such as a file system or object storage device.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing all or some of the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432 and/or L2 cache 70, as described in detail below). In one example, program instructions implementing a selective snapshot module 60 may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may each include a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as files 30 of FIG. 1 or snapshots 70 of FIG. 1, as described above.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
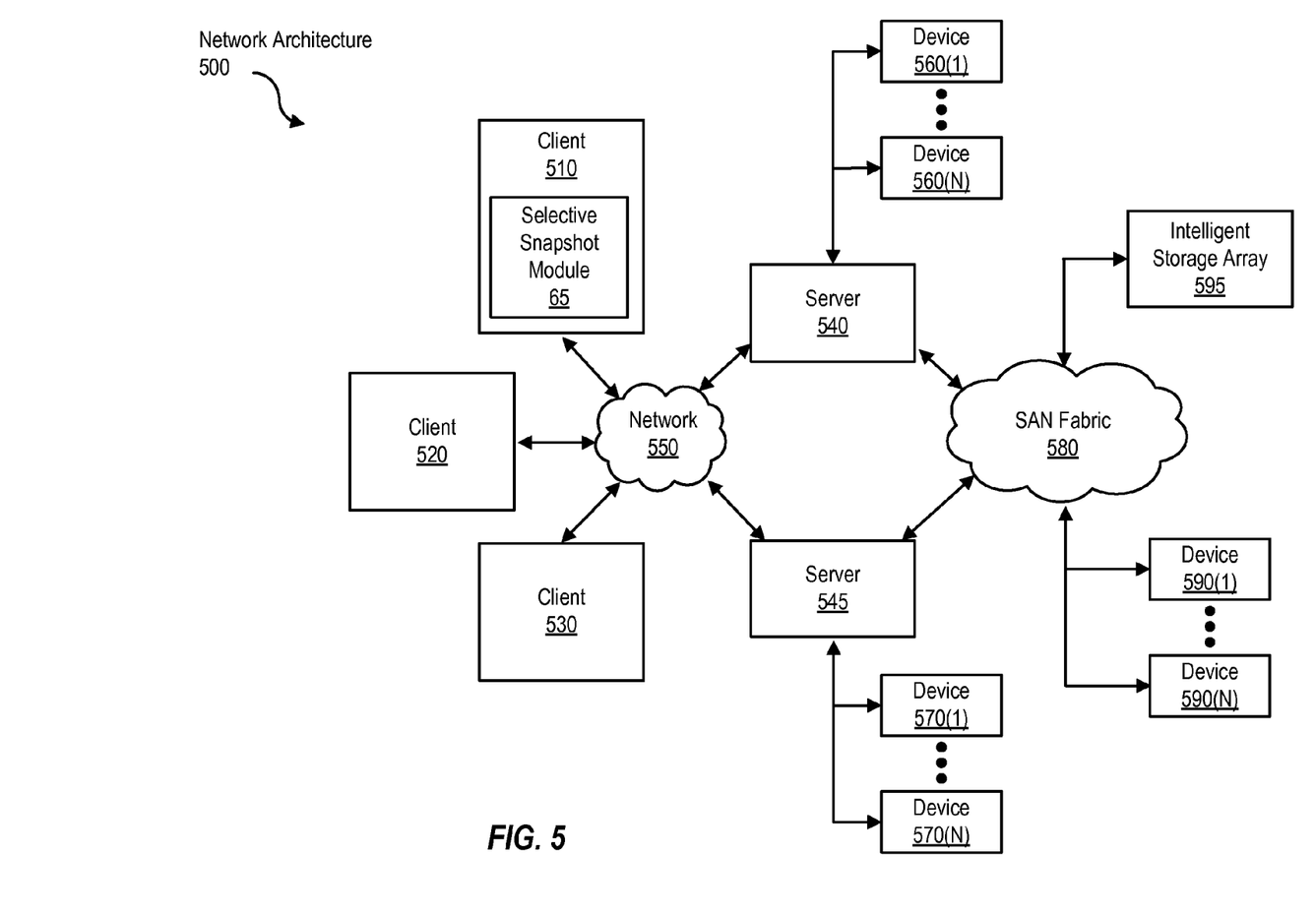
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include a selective snapshot module 65 as shown in FIGS. 1 and 4.

As illustrated in FIG. 5, one or more storage devices 560 (1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS).

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595.

SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560 (1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of the computing devices in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a selective snapshot module 65 in FIG. 1 may transform behavior of a computing device in order to cause the computing device to generate snapshots of more than two but fewer than all of the units of data included within a collectively managed set of data.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  receiving a request to generate a selective snapshot of a collectively managed set of data, wherein
    the request comprises an identifying tag to identify an identified subset of the collectively managed set of data, and
    the identifying tag is one of a plurality of tags;
  generating the selective snapshot of the collectively managed set of data, wherein the selective snapshot comprises a snapshot inode for each unit of data within the collectively managed set of data;
  detecting a modification to a first unit of data within the collectively managed set of data, wherein
    a first tag is assigned to the first unit of data,
    the detecting occurs subsequent to the generation of the selective snapshot of the collectively managed set of data, and
    the first tag identifies a first subset of the collectively managed set of data;
  based on a comparison of the first tag to the identifying tag, determining whether the first unit of data is included in the identified subset of the collectively managed set of data, wherein
    the identified subset comprises at least two of the units of data and fewer than all of the units of data in the collectively managed set of data;
  based upon whether the first unit of data is included in the identified subset, selecting whether to preserve an original value of the first unit of data, wherein
    the original value is a value of the first unit of data at a point in time at which the selective snapshot was generated,
    the selecting occurs subsequent to generation of the selective snapshot of the collectively managed set of data, and
    the selecting is performed by a computing device implementing a selective snapshot module;
  wherein the determining comprises determining that the first unit of data is not included in the identified subset, and wherein the selecting comprises selecting to not preserve the original value of the first unit of data;
  wherein the determining comprises determining that the first unit of data is included in the identified subset, and wherein the selecting comprises selecting to preserve the original value of the first unit of data; and
  transferring the original value of the first unit of data to the snapshot inode for the first unit of data.

2. The method of claim 1, wherein the collectively managed set of data is an object storage device, and wherein the first unit of data is an object.

3. The method of claim 1, wherein the collectively managed set of data is a file system, and wherein the first unit of data is a file.

4. The method of claim 3, further comprising:
  detecting that a new file is being added to a directory within the file system; and
  associating the new file with a tag, wherein the directory is associated with the tag prior to the detecting that the new file is being added.

5. The method of claim 1, wherein the determining comprises determining that the first unit of data is included in the identified subset if the first tag has the same value as the identifying tag.

6. The method of claim 1, further comprising:
  performing the transferring if the selective snapshot is generated using a space efficient snapshot technique.

7. The method of claim 6, wherein
  the space efficient snapshot technique is a copy on write (COW) snapshot technique or a redirect on write (ROW) snapshot technique.

8. A non-transitory computer readable storage medium comprising program instructions executable to:

receive a request to generate a selective snapshot of a collectively managed set of data, wherein the request comprises an identifying tag of one or more tags initially assigned to identify an identified subset of the collectively managed set of data, and a first tag of the one or more tags initially assigned associated with the request to generate the selective snapshot, wherein the first tag is associated with a first unit of data within the collectively managed set of data;

generate the selective snapshot of the collectively managed set of data, wherein the selective snapshot comprises a snapshot inode for each unit of data within the collectively managed set of data;

detect a modification to the first unit of data within the collectively managed set of data, wherein
- the first tag is assigned to the first unit of data,
- detection of the modification occurs subsequent to generation of the selective snapshot of the collectively managed set of data, and
- the first tag identifies one or more of a plurality of subsets of the collectively managed set of data;

determine, based on a comparison of the first tag to the identifying tag, whether the first unit of data is included in the identified subset of the collectively managed set of data, wherein the identified subset comprises at least two of the units of data and fewer than all of the units of data in the collectively managed set of data;

select, based upon whether the unit of data is included in the identified subset, whether to preserve an original value of the first unit of data, wherein the original value is a value of the first unit of data at a point in time at which the selective snapshot was generated, and the selecting occurs subsequent to generation of the selective snapshot of the collectively managed set of data;

wherein determining whether the first unit of data is included in the identified subset comprises determining that the first unit of data is not included in the identified subset, and wherein selecting whether to preserve the original value comprises selecting to not preserve the original value of the first unit of data;

wherein determining whether the first unit of data is included in the identified subset comprises determining that the first unit of data is included in the identified subset, and wherein selecting whether to preserve the original value comprises selecting to preserve the original value of the first unit of data; and transfer the original value of the first unit of data to the snapshot inode for the first unit of data.

9. The non-transitory computer readable storage medium of claim 8, wherein the collectively managed set of data is an object storage device, and wherein the first unit of data is an object.

10. The non-transitory computer readable storage medium of claim 8, wherein the collectively managed set of data is a file system, and wherein the first unit of data is a file.

11. The non-transitory computer readable storage medium of claim 10, wherein the program instructions are further executable to:
detect that a new file is being added to a directory within the file system; and
associate the new file with a tag, wherein the directory is associated with the tag prior to detection that the new file is being added.

12. The computer readable storage medium of claim 8, wherein determining whether the first unit of data is included in the identified subset comprises determining that the first unit of data is included in the identified subset if the first tag has the same value as the identifying tag.

13. A system comprising:
one or more processors; and
a memory coupled to the one or more processors, wherein the memory stores program instructions executable by the one or more processors to:
receive a request to generate a selective snapshot of a collectively managed set of data, wherein the request comprises an identifying tag of one or more tags initially assigned to identify an identified subset of the collectively managed set of data, and a first tag of the one or more tags initially assigned associated with the request to generate the selective snapshot, wherein the first tag is associated with a first unit of data within the collectively managed set of data;

generate the selective snapshot of the collectively managed set of data, wherein the selective snapshot comprises a snapshot inode for each unit of data within the collectively managed set of data;

detect a modification to the first unit of data within the collectively managed set of data, wherein
- a first tag is assigned to the first unit of data,
- detection of the modification occurs subsequent to generation of the selective snapshot of the collectively managed set of data, and
- the first tag identifies one or more of a plurality of subsets of the collectively managed set of data;

determine, based on a comparison of the first tag to the identifying tag, whether the first unit of data is included in the identified subset of the collectively managed set of data, wherein the identified subset comprises at least two of the units of data and fewer than all of the units of data in the collectively managed set of data;

select, based upon whether the unit of data is included in the identified subset, whether to preserve an original value of the first unit of data, wherein the original value is a value of the first unit of data at a point in time at which the selective snapshot was generated, and the selecting occurs subsequent to generation of the selective snapshot of the collectively managed set of data;

wherein determining whether the first unit of data is included in the identified subset comprises determining that the first unit of data is not included in the identified subset, and wherein selecting whether to preserve the original value comprises selecting to not preserve the original value of the first unit of data;

wherein determining whether the first unit of data is included in the identified subset comprises determining that the first unit of data is included in the identified subset, and wherein selecting whether to preserve the original value comprises selecting to preserve the original value of the first unit of data; and transfer the original value of the first unit of data to the snapshot inode for the first unit of data.

14. The system of claim 13, wherein the collectively managed set of data is an object storage device, and wherein the first unit of data is an object.

15. The system of claim 13, wherein the collectively managed set of data is a file system, and wherein the first unit of data is a file.

16. The system of claim 15, wherein the program instructions are further executable to:
detect that a new file is being added to a directory within the file system; and associate the new file with a tag, wherein the directory is associated with the tag prior to detection that the new file is being added.

17. The system of claim 13, wherein determining whether the first unit of data is included in the subset comprises determining that the first unit of data is included in the identified subset if the first tag has the same value as the identifying tag.

* * * * *